Figure 2:
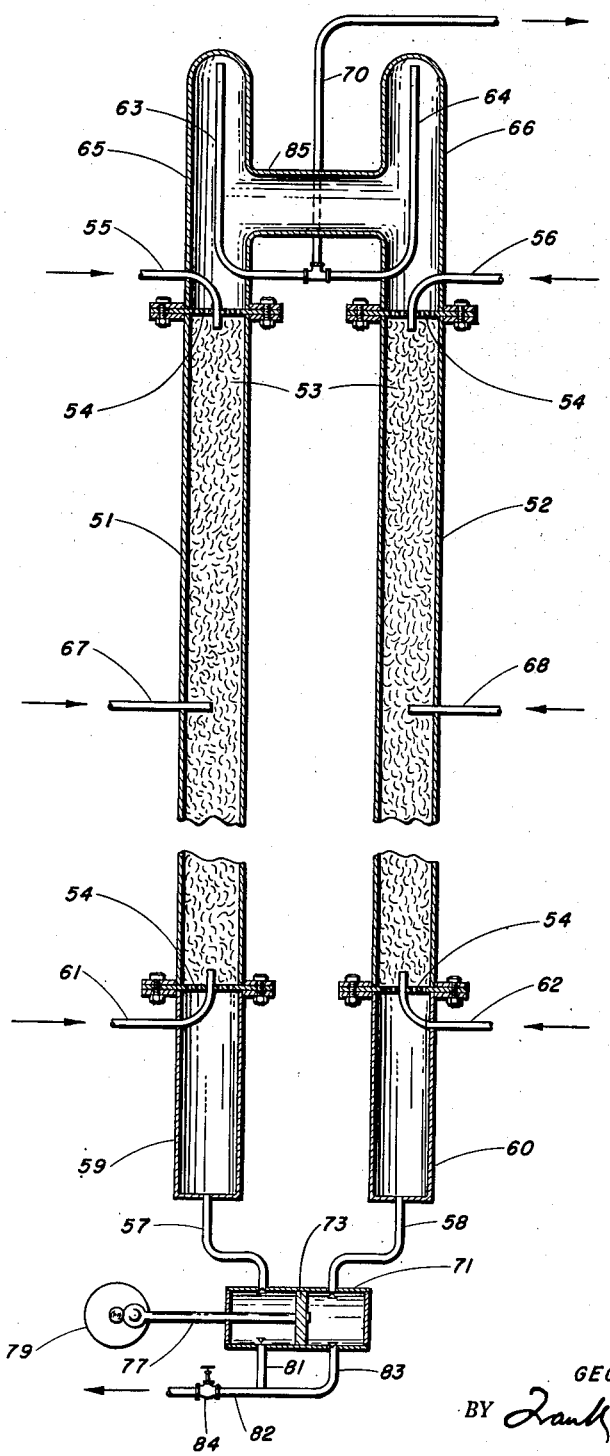

Oct. 1, 1957
G. FEICK III
2,808,318
LIQUID-LIQUID CONTACT APPARATUS
Filed Sept. 30, 1950
2 Sheets-Sheet 1
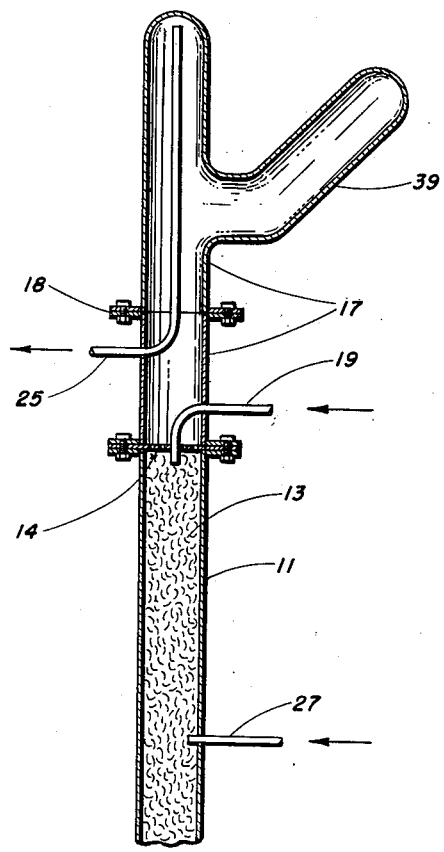
Fig. 1
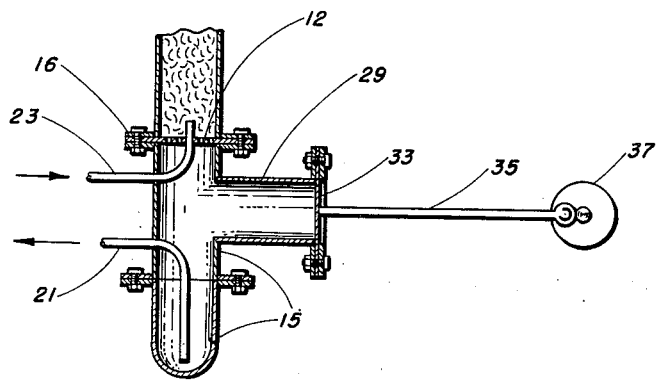
INVENTOR.
GEORGE FEICK, III
BY Frank N. Houghton
AGENT Oct. 1, 1957

G. FEICK III 2,808,318

LIQUID-LIQUID CONTACT APPARATUS

Filed Sept. 30, 1950

2 Sheets-Sheet 2

INVENTOR.
GEORGE FEICK, III
BY Frank N. Houghton
AGENT

United States Patent Office 2,808,318
Patented Oct. 1, 1957

2,808,318

LIQUID-LIQUID CONTACT APPARATUS

George Feick III, Needham, Mass., assignor to Arthur D. Little, Inc., Cambridge, Mass., a corporation of Massachusetts Application September 30, 1950, Serial No. 187,714

1 Claim. (Cl. 23—270.5)

This invention relates to means and method for effecting intimate contact between liquids of different specific gravities which are immiscible, or substantially immiscible, for various purposes such as washing, extraction, and others wherein liquid-liquid contact is employed, all of which will be referred to herein generically as "extraction." In addition to the said two immiscible liquids, there will also be present one or more substances which are more or less soluble in or miscible with each of said liquids, and which it is desired to transfer, by the extraction step, from one liquid to the other, or to concentrate in one of said liquids in preference to the other.

Many devices and systems have been proposed for improving the contact between immiscible liquids in extraction processes. One such system provides a vertical column with a series of packings, with agitating devices between the packings, as exemplified in German Patent 521,541 and Scheibel U. S. Patent 2,493,265. Another, shown in van Dijck U. S. Patent 2,011,186, provides a vertical column with a few widely spaced perforated plates, together with means to force the liquids back and forth through the perforations, there being a body of the heavier liquid above each plate and a body of the lighter liquid below each plate. Neither of these systems, however, approaches the effectiveness of the herein-described invention in providing outstanding improvement over older known methods for liquid-liquid extraction.

In accordance with the present invention, there is provided a vertically disposed column which is entirely filled with packing, of a type described hereinafter, except for a collecting chamber at the bottom and another at the top. The heavier of the immiscible liquids is admitted into the packed space at the top thereof, and its overall motion is downward through the packing and into the collecting chamber at the bottom, whence it is withdrawn. The lighter of the immiscible liquids is admitted into the packed space at the bottom thereof, and its overall motion is upward through the packing, countercurrent to the heavier liquid, and into the collecting chamber at the top, whence it is withdrawn. This invention in particular provides means for agitating the liquids within the column, by a series of rapidly alternating pulsations whereby the liquids are given an up-and-down motion with respect to the packing and the column.

By providing a properly packed column, and rapid pulsations so that the two immiscible liquids are in the form of a substantially uniform dispersion of one liquid in the other throughout the packed section of the column, without being in the form of a relatively inseparable emulsion, the extraction capacity of such a column can be readily increased more than five-fold above that of a like column without the rapidly alternating pulsations.

This invention will now be described in further detail with reference to the accompanying drawings, wherein:

Fig. 1 represents a vertical cross-section, largely diagrammatic, of one modification of the present invention; and Fig. 2 represents a vertical cross-section, also largely diagrammatic, of another modification thereof.

In the drawings, referring to Fig. 1, the numeral 11 represents an extraction column provided with packing 13 throughout the greater part of the length thereof, and collecting chambers 15 at the bottom of the column and 17 at the top thereof. Packing 13 is retained in place by perforated plates or screens 12 and 14 at bottom and top respectively. These plates or screens may be part of flange assemblies 16 and 18 which are convenient means for attaching chambers 15 and 17 respectively to the packed part of the extraction column. The heavier liquid is admitted through line 19 which extends a short distance through plate 14 into the top of packing 13, and is removed through line 21 after collecting in chamber 15. The lighter liquid is admitted through line 23 which extends a short distance through plate 12 into the bottom of packing 13, and is removed through line 25 after collecting in chamber 17. If desired, one or more side streams of substances to be treated in the extraction operation may be introduced, as through line 27.

There is also provided, in accordance with this invention, a side chamber 29 communicating with chamber 15. Chamber 29 is provided with a diaphragm 33, which is moved back and forth by rod 35 connected to eccentric 37, the latter being rotated by any suitable source of power (not shown). A piston pump may be used in place of the diaphragm pump, and may be similarly driven by rod 35 and eccentric 37.

At the top of the column, in open communication with chamber 17, is an air chamber 39 to provide an air cushion for the rapidly oscillating liquids within the column.

In Fig. 2, a somewhat similar type of apparatus is shown, wherein two columns instead of one are employed. These columns are designated 51 and 52; they are provided with packing 53, plates or screens 54 for holding the packing in place, lead-in lines 55, 56 for the heavier liquid extending a short distance into the top of the packing, draw-off lines 57 and 58 in bottom collecting chambers 59 and 60 respectively for removing the heavier liquid, lead-in lines 61, 62 for the lighter liquid extending a short distance into the bottom of the packing, and draw-off lines 63 and 64 (which lead into conduit 70) in upper collecting chambers 65 and 66 respectively for removing the lighter liquid. Provision for leading in side streams may be made at 67 or 68 or both as desired, and as shown in connection with Fig. 1 at 27.

Draw-off lines 57 and 58 communicate with a cylinder 71, one on each side of a piston 73 which fits closely against the walls of cylinder 71 and is reciprocated by rod 77 driven by eccentric 79, which in turn is driven by any suitable source of power (not shown). Outlet lines 81 and 83 from cylinder 71 are provided, and suitable check valves as shown, so that movement of the piston to the left draws liquid from line 58 into the right-hand chamber of the cylinder 71 and expels liquid from the left-hand chamber through line 81, while movement of the piston to the right draws liquid from line 57 into the left-hand chamber of the cylinder 71 and expels liquid from the right-hand chamber through line 83. Lines 81 and 83 leads into line 82 in which is located a back-pressure valve 84, which restricts the outflow from line 82 sufficiently so that oscillation of piston 73 effects an up-and-down motion of the fluids in columns 51 and 52. Passageway 85 provides communication between upper chambers 65 and 66, to even the pressure between the liquids in the two columns as the liquid rises in one and falls in the other due to the movement of piston 73.

The packing 13 (Fig. 1) and 53 (Fig. 2) may be any suitable material which provides many openings, distributed throughout the packed space. I may use, for example, saddle-shaped packings made of wire mesh, or other types of small pieces of wire mesh of more or less irregular shape such that small open spaces are provided between the pieces, or alternating sheets of flat and of corrugated wire mesh lying one upon the other, or small spring-like coils of wire of short length, filling the packed space. This packing extends throughout most of the length of the column, as shown in the drawings, in such a manner that there are no substantial spaces within the packed volume where bodies of liquid may collect out of contact with packing.

The operation of the system of this invention may be described by a specific example, referring to the apparatus shown in Fig. 1. A column 11, of 1½ inches internal diameter, is packed with ½ inch stainless steel wire mesh saddles, of approximately the shape of Berl saddles, throughout 3 feet of its length. This packing is held in place by perforated plates 12 and 14. A solution of benzoic acid in toluene is introduced at the bottom through line 23, and water is introduced through line 19. As soon as the column is adequately filled with these liquids, diaphragm 33 is set to oscillating rapidly by means of rod 35 and eccentric 37. The results of a number of runs made at various speeds of oscillation or pulsation, and with different strokes, are shown in the following table. The term "transfer coefficient" is the mass of material transferred (in this case, the mass of benzoic acid transferred from the toluene to the water) divided by the product of the time in hours, the number of cubic feet in the packed space of the column, and the mean concentration difference. The term "HTU" (height of transfer unit) means the height in feet of the packed column required to transfer a unit amount of material (here, benzoic acid) per unit time per unit of concentration difference. "Speed" is given in revolutions (i. e. to-and-fro strokes) of diaphragm 33 per minute; "amplitude" is the stroke length in inches.

| Speed | Amplitude | Transfer Coefficient | HTU |
|---|---|---|---|
| 0 | | 10.16 | 7.5 |
| 0 | | 9.14 | 8.6 |
| 0 | | 10.50 | 7.0 |
| 0 | | 11.76 | 6.9 |
| 250 | ⅛ | 28.6 | 1.44 |
| 250 | ⅛ | 27.2 | 1.35 |
| 500 | ⅛ | 51.2 | 1.14 |
| 500 | ⅛ | 66.1 | .78 |
| 750 | ⅛ | 38.5 | .93 |
| 750 | ⅛ | 36.9 | .97 |
| 1,000 | ⅟₁₆ | 47.2 | .76 |
| 1,000 | ⅟₁₆ | 37.6 | .92 |
| 1,000 | ⅟₁₆ | 55.4 | 1.00 |
| 1,000 | ⅟₁₆ | 33.9 | 1.63 |

As is indicated by the foregoing table, optimum speed conditions with ⅛ inch amplitude for the apparatus described are around 500 R. P. M., although good operating conditions exist at the 250 R. P. M. and the 750 R. P. M. speeds. At 1000 R. P. M. with ⅛ inch amplitude, the apparatus is practically inoperative because of the formation of an emulsion which cannot, as a practical matter, be separated in the top and bottom chambers within a reasonable length of time. However, when the amplitude is decreased to ⅟₁₆ inch, effective operation of the described apparatus can be carried out, as indicated in the table. Great savings in column height can be attained, as indicated under the heading "HTU," for all conditions of operation indicated in the foregoing table wherein pulsations are employed.

The speed of pulsation will vary roughly inversely with the length of the stroke of the diaphragm or piston; both of these variables will be adjusted in accordance with the size of the column and the particular packing used. Nevertheless, pulsation should be carried out so that a substantially uniform dispersion of the immiscible liquids is formed throughout the packed space, and excess pulsation speeds and amplitudes, whereby relatively inseparable emulsions are formed, should be avoided, since such emulsions separate too poorly and render the procedure ineffective for practical operation.

When no pulsations are present, the two immiscible liquids tend to channel through the packing, and while they may pass through fairly rapidly, the effectiveness of contact, or effective throughput, is extremely small for a given length of column. With an excessively high rate of pulsation, excessively fine emulsification occurs; the resulting emulsion moves into both the top and bottom collecting chambers and tends to be drawn off at lines 21 and 25 (Fig. 1) and lines 57, 58, 63, and 64 (Fig. 2). In between is the desired area of operation, where the pulsations are effective to break up the two immiscible streams into a dispersion, in the form of drops of one liquid in the other. These drops are readily visible, and separation occurs easily in the collecting chambers.

I claim:

The apparatus for effecting intimate contact between two substantially immiscible liquids of different specific gravities, which comprises a vertically elongated column, a lower foraminous partition and an upper foraminous partition extending transversely of said column and dividing the space in said column into minor bottom and top zones and a major intermediate zone, a fixed bed of small saddle-type packing bodies extending substantially uniformly throughout said intermediate zone from said lower partition to said upper partition, a lower inlet and an upper inlet for introducing into said column, respectively, the lighter liquid in the vicinity of said lower partition and the heavier liquid in the vicinity of said upper partition, a lower outlet and an upper outlet for withdrawing from said column, respectively, the heavier liquid from a level below said lower inlet and the lighter liquid from a level above said upper inlet, a diaphragm pump disposed in communication with said bottom zone for rapidly pulsating said liquids upwardly through said bed, and a branch chamber disposed in communication with said top zone to provide a gas cushion for the rapidly pulsated liquids.

References Cited in the file of this patent
UNITED STATES PATENTS

| | | |
|---|---|---|
| 2,011,186 | Van Dijck | Aug. 13, 1935 |
| 2,090,496 | Wynn | Aug. 17, 1937 |
| 2,183,837 | Hamilton et al. | Dec. 19, 1939 |
| 2,493,265 | Scheibel | Jan. 3, 1950 |